US012400498B2

(12) United States Patent
Tachibana et al.

(10) Patent No.: US 12,400,498 B2
(45) Date of Patent: Aug. 26, 2025

(54) INFORMATION PROCESSING DEVICE, INFORMATION PROCESSING METHOD, AND STORAGE MEDIUM

(71) Applicant: TOYOTA JIDOSHA KABUSHIKI KAISHA, Toyota (JP)

(72) Inventors: Katsuharu Tachibana, Nagoya (JP); Nana Kikuire, Shizuoka-ken (JP); Hiroshi Inoue, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 66 days.

(21) Appl. No.: 18/338,424

(22) Filed: Jun. 21, 2023

(65) Prior Publication Data
US 2023/0419754 A1   Dec. 28, 2023

(30) Foreign Application Priority Data

Jun. 22, 2022   (JP) .................................. 2022-100568

(51) Int. Cl.
*G07C 9/00*   (2020.01)

(52) U.S. Cl.
CPC ................................ *G07C 9/00309* (2013.01)

(58) Field of Classification Search
CPC ...... G07C 9/00309; G07C 2009/00865; G07C 9/00857; G07C 9/00571; G06F 21/62; H04W 4/40; H04W 12/08; B60R 25/20; B60R 25/24; B60R 25/248; B60R 2325/103
See application file for complete search history.

(56) References Cited

U.S. PATENT DOCUMENTS

| 9,845,071 | B1* | 12/2017 | Krishnan | G07C 9/0069 |
| 10,437,977 | B2* | 10/2019 | Lambert | H04W 12/082 |
| 10,589,719 | B1* | 3/2020 | Sohn | B60R 25/241 |
| 11,787,367 | B1* | 10/2023 | Gaffney | B60R 25/24 705/5 |
| 2008/0150683 | A1* | 6/2008 | Mikan | G07C 9/00309 340/5.31 |
| 2011/0060480 | A1* | 3/2011 | Mottla | G07C 9/00571 701/2 |
| 2011/0105028 | A1* | 5/2011 | Yu | H04W 48/18 455/67.11 |

(Continued)

FOREIGN PATENT DOCUMENTS

| JP | 2013159980 A | 8/2013 |
| JP | 2020033707 A | 3/2020 |

(Continued)

*Primary Examiner* — Adnan Aziz
(74) *Attorney, Agent, or Firm* — Dickinson Wright, PLLC

(57) ABSTRACT

An information processing device that is usable as a key of a vehicle, the information processing device including: a display section that is configured to display information of at least one other device that is connected to the information processing device; a memory; and a processor coupled to the memory and that is configured to: receive a user selection selecting, from the at least one other device displayed at the display section, at least one other device to be operated as a key of the vehicle; and execute duplication processing to each of the selected at least one other device to allow the selected at least one other device to be used as the key of the vehicle.

9 Claims, 11 Drawing Sheets

(56) References Cited

U.S. PATENT DOCUMENTS

| | | | | |
|---|---|---|---|---|
| 2012/0164989 A1* | 6/2012 | Xiao | .................... | H04L 67/125 |
| | | | | 715/764 |
| 2014/0129053 A1* | 5/2014 | Kleve | .................... | B60R 25/24 |
| | | | | 701/2 |
| 2014/0156111 A1* | 6/2014 | Ehrman | ................ | G07B 15/00 |
| | | | | 701/2 |
| 2014/0232524 A1* | 8/2014 | Nakai | ................ | G07C 9/00309 |
| | | | | 340/5.61 |
| 2014/0320884 A1* | 10/2014 | Ide | .................... | H04N 1/4413 |
| | | | | 358/1.14 |
| 2019/0197808 A1* | 6/2019 | Jinnai | .................... | B60R 25/24 |
| 2019/0318275 A1* | 10/2019 | Sakurada | ................ | G06Q 10/02 |
| 2020/0307515 A1* | 10/2020 | Hiruta | .................... | G06F 21/31 |
| 2021/0168602 A1* | 6/2021 | Kim | .................... | H04W 12/041 |
| 2021/0394637 A1* | 12/2021 | Penilla | ................ | B60R 25/2018 |
| 2022/0094527 A1* | 3/2022 | Narumi | ................ | H04L 9/3228 |
| 2022/0417228 A1* | 12/2022 | Singh | .................... | H04L 63/062 |
| 2024/0227730 A1* | 7/2024 | Matsushita | ......... | H04W 12/041 |
| 2024/0233464 A1* | 7/2024 | Matsushita | ........ | G07C 9/00571 |

FOREIGN PATENT DOCUMENTS

| | | | | |
|---|---|---|---|---|
| JP | 2021528028 A | | 10/2021 | |
| KR | 20200030136 A | * | 3/2020 | |
| WO | 2013076760 A1 | | 5/2013 | |
| WO | WO-2019241605 A1 | * | 12/2019 | .............. H04W 4/80 |

\* cited by examiner

INFORMATION PROCESSING DEVICE, INFORMATION PROCESSING METHOD, AND STORAGE MEDIUM

CROSS-REFERENCE TO RELATED APPLICATION

This application is based on and claims priority under 35 USC 119 from Japanese Patent Application No. 2022-100568 filed on Jun. 22, 2022, the disclosure of which is incorporated by reference herein.

BACKGROUND

Technical Field

The present disclosure relates to an information processing device, an information processing method, and a non-transitory storage medium storing an information processing program.

Related Art

Cars are widely used as an element of mobility services, and various services such as car sharing are expected to become more numerous and commonplace. In accordance with this trend, smartphones are being used as keys for cars, and demands on wireless digital key systems that do not require the handover of a physical key are rising.

Technologies relating to wireless digital key systems include, for example, Japanese Patent Application Laid-Open (JP-A) No. 2020-033707. JP-A No. 2020-033707 discloses an electronic key system for a vehicle that is provided with a portable device and an on-board apparatus. The electronic key system unlocks doorlocks of the vehicle and suchlike, dependent on authentication of the portable device by the on-board apparatus.

The Car Connectivity Consortium (CCC) defines a standard for electronic key systems for vehicles. In the standard defined by CCC, devices that are an owner device and friend devices are defined. The owner device is a device used by an owner of a vehicle, and the friend devices are devices that are expected to be used by family members or friends of the owner.

However, when plural friend devices are registered in addition to an owner device conforming to CCC, additionally registering the friend devices one at a time is effortful for a user.

SUMMARY

The present disclosure provides an information processing device, an information processing method and a non-transitory storage medium storing an information processing program that, when other terminals are added as a key of a vehicle in addition to a terminal that is used as the key, reduce the effort of registering the additional terminals.

A first aspect of the present disclosure is an information processing device that is usable as a key of a vehicle, the information processing device including: a display section that is configured to display information of at least one other device that is connected to the information processing device; memory; and a processor coupled to the memory and that is configured to: receive a user selection selecting, from the at least one other device displayed at the display section, at least one other device to be operated as a key of the vehicle; and execute duplication processing to each of the selected at least one other device to allow the selected at least one other device to be used as the key of the vehicle.

The information processing device according to the first aspect duplicates key information from that device to the other device(s), enabling use of the other device(s) as the key of the vehicle. In this information processing device, at least one other device to be operated as the key of the vehicle is selected by a user from the at least one other device displayed at the display section. The duplication processing allowing the other device(s) to be used as the key of the vehicle is executed to each of the selected at least one other device. According to this information processing device, when other terminals are added as a key of the vehicle in addition to a terminal that is used as the key, the effort of registering the addition may be reduced.

A second aspect of the present disclosure is an information processing method including: displaying information of at least one other device connected to an information processing device, the information processing device being usable as a key of a vehicle; receiving a user selection selecting, from the displayed at least one other device, at least one other device to be operated as a key of the vehicle; and executing duplication processing to each of the selected at least one other device to allow the selected at least one other device to be used as the key of the vehicle.

A third aspect of the present disclosure is a non-transitory storage medium storing a program that is executable by a computer to execute information processing, the information processing including: displaying information of at least one other device connected to an information processing device, the information processing device being usable as a key of a vehicle; receiving a user selection selecting, from the displayed at least one other device, at least one other device to be operated as a key of the vehicle; and executing duplication processing to each of the selected at least one other device to allow the selected at least one other device to be used as the key of the vehicle.

According to the present disclosure, when other terminals are added as a key of a vehicle in addition to a terminal that is used as the key, effort of registering the additional terminals may be reduced.

DETAILED DESCRIPTION

A key management system that includes a terminal serving as an information processing device of the present disclosure is described. The key management system is a system that manages electronic keys (below referred to simply as keys) to be used for unlocking, locking, starting and the like of a vehicle.

First Exemplary Embodiment

—Overall Structure—

Figure 1:
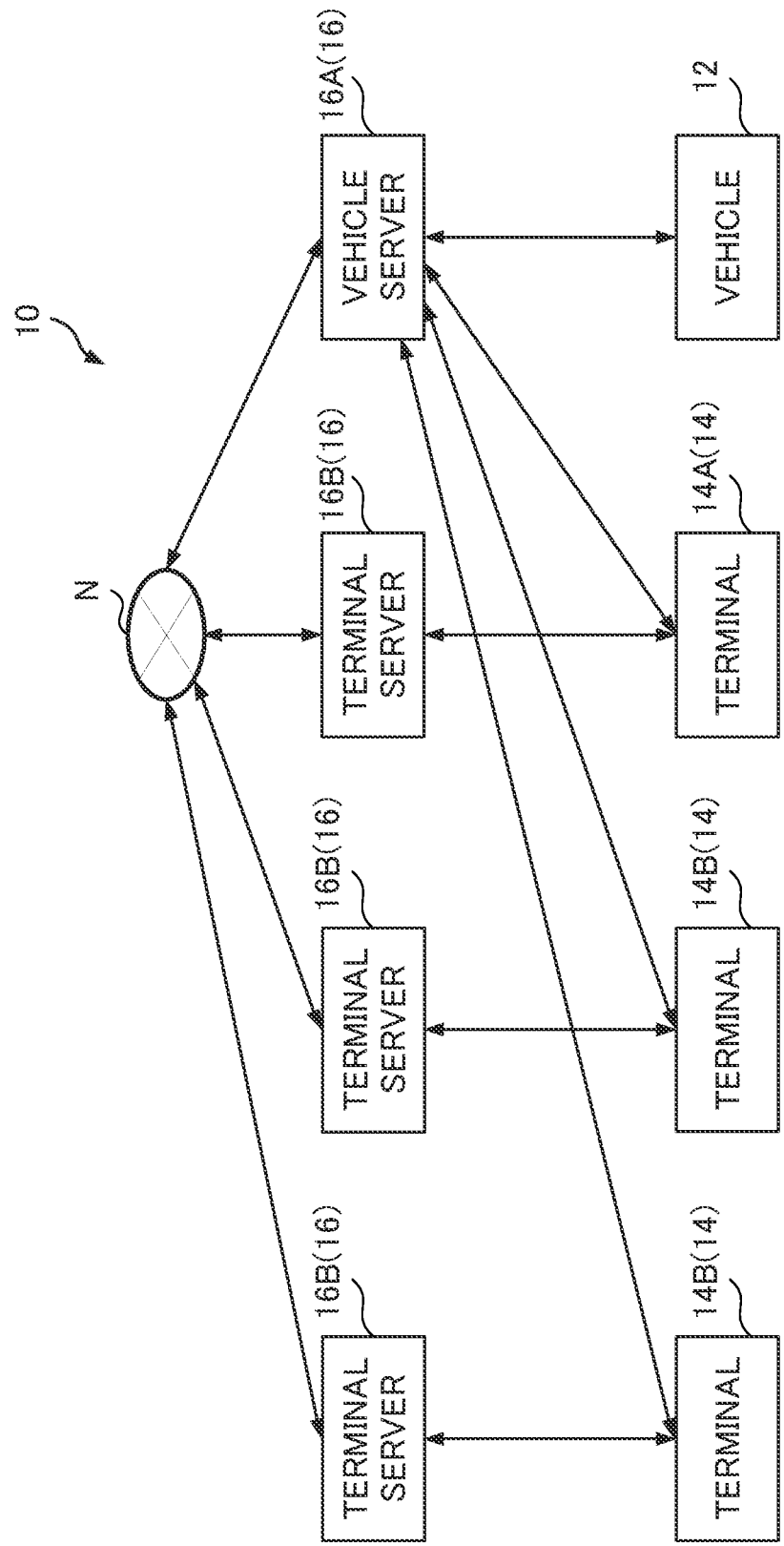
FIG. 1 is a diagram showing schematic structures of a key management system according to a first exemplary embodiment.

As shown in FIG. 1, a key management system 10 according to a first exemplary embodiment includes a vehicle 12, terminals 14 and servers 16. The servers 16 include a vehicle server 16A that manages the vehicle 12 and terminal servers 16B that manage the terminals 14. The terminals 14 according to the present exemplary embodiment include a terminal 14A that is an owner device, at which key information is specified in advance, and terminals 14B that are friend devices at which the key information of the terminal 14A is duplicated. Each terminal 14 can be illustrated by a terminal such as a smartphone or the like that is carried by a driver of the vehicle 12. The terminal 14A is an example of the information processing device and each terminal 14B is an example of an other device.

The vehicle 12 and the vehicle server 16A are connected to be capable of communications with one another. Each terminal 14 and the corresponding terminal server 16B are connected to be capable of communications with one another. Each terminal 14 and the vehicle server 16A may be connected to be capable of communications with one another. The vehicle server 16A and terminal servers 16B are connected to one another via a public network N.

Numbers of the vehicle 12, the terminals 14 and the servers 16 not limited to the numbers illustrated in FIG. 1. The terminal servers 16B are not necessarily provided one for each of the terminals 14; the plural terminals 14 may be connected to one of the terminal server 16B.

—Vehicle—

Figure 2:
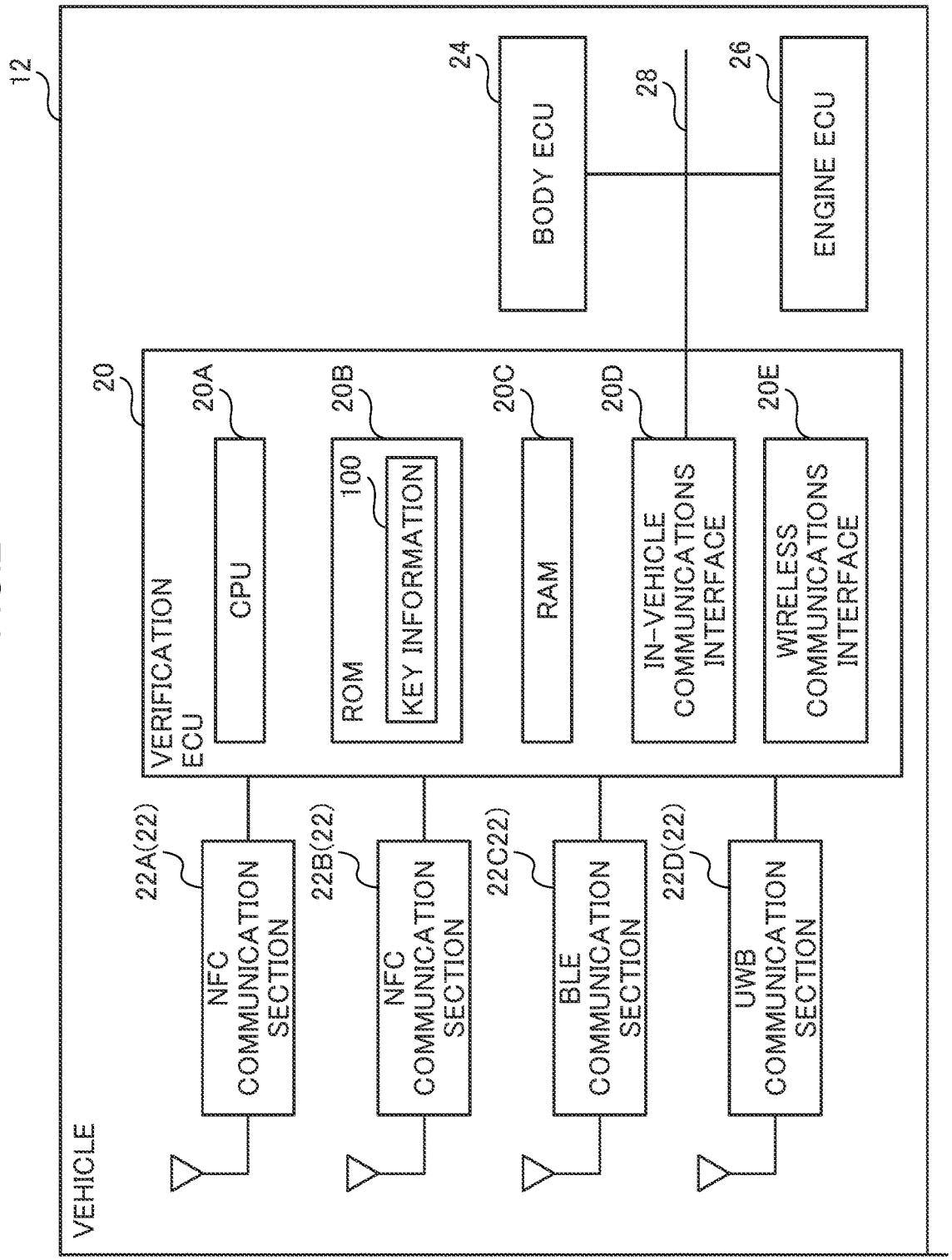
FIG. 2 is a block diagram showing hardware structures of a vehicle according to the first exemplary embodiment.

As shown in FIG. 2, the vehicle 12 includes a verification electronic control unit (ECU) 20, communication sections 22, a body ECU 24 and an engine ECU 26.

The verification ECU 20 includes a central processing unit (CPU) 20A, read-only memory (ROM) 20B, random access memory (RAM) 20C, an in-vehicle communications interface 20D and a wireless communications interface 20E. The CPU 20A, ROM 20B, RAM 20C, in-vehicle communications interface 20D and wireless communications interface 20E are connected to be capable of communications with one another via an internal bus (not shown in the drawings).

The CPU 20A is a central arithmetic processing unit that executes various programs and controls respective parts.

That is, the CPU 20A reads a program from the ROM 20B and executes the program, using the RAM 20C as a workspace.

The ROM 20B stores various programs and various kinds of data. Key information 100, which is information relating to a key of the vehicle 12, is stored at the ROM 20B according to the present exemplary embodiment.

The RAM 20C serves as a work area and temporarily stores programs and data.

The in-vehicle communications interface 20D is an interface for connecting with a body ECU 24 and an engine ECU 26. The interface uses a communications standard according to Controller Area Network (CAN) or Ethernet (registered trademark). The in-vehicle communications interface 20D is connected to an external bus 28.

The wireless communications interface 20E is an interface for communicating with the vehicle server 16A. The wireless communications interface 20E employs a communications standard such as 5G, 4G, LTE or the like. If communication with the vehicle server 16A by a data communication module (DCM), another ECU or the like is possible, the wireless communications interface 20E need not necessarily be included at the verification ECU 20.

The body ECU 24 is an ECU that controls equipment such as lights, doors and the like of the vehicle 12. The body ECU 24 is connected to a door locking device, which is not shown in the drawings, and may control locking and unlocking of doors of the vehicle 12.

The engine ECU 26 is an ECU that controls an engine of the vehicle 12. The engine ECU 26 may control starting and stopping of the engine.

The communication sections 22 include a near field communication (NFC) communication section 22A, an NFC communication section 22B, a Bluetooth (registered trademark) Low Energy (BLE) communication section 22C and an Ultra Wide Band (UWB) communication section 22D. The NFC communication section 22A is provided at each door of the vehicle 12, and the NFC communication section 22B is provided at a center console or the like of the vehicle 12. The BLE communication section 22C and UWB communication section 22D are disposed at locations that enable reception of electromagnetic waves from inside the vehicle and from surroundings of the vehicle 12. Plural numbers of the BLE communication section 22C and the UWB communication section 22D may be disposed at the vehicle 12.

—Terminal—

Figure 3:
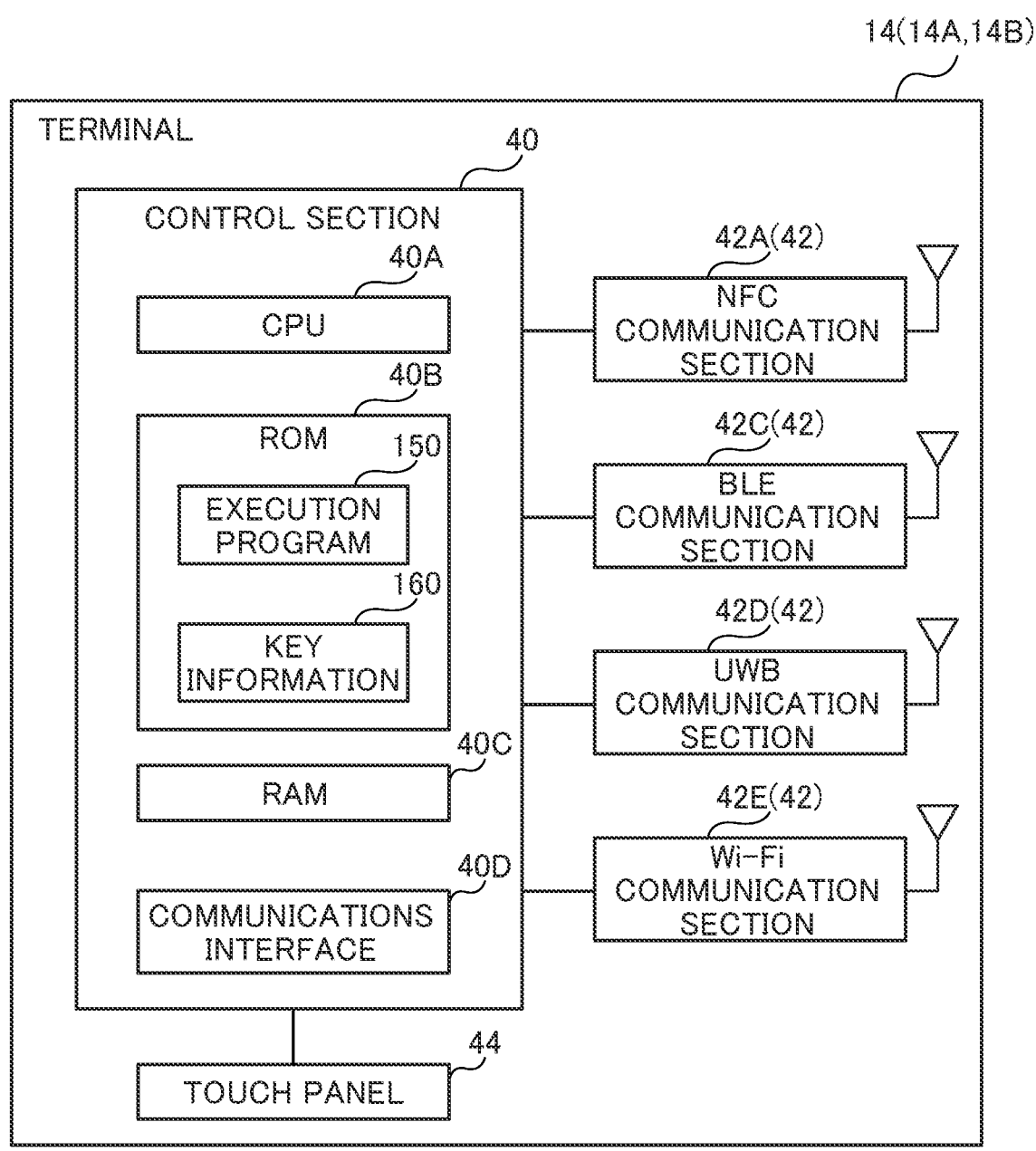
FIG. 3 is a block diagram showing hardware structures of a terminal according to the first exemplary embodiment.

As shown in FIG. 3, each terminal 14 according to the present exemplary embodiment includes a control section 40, communication sections 42, and a touch panel 44.

Figure 4:
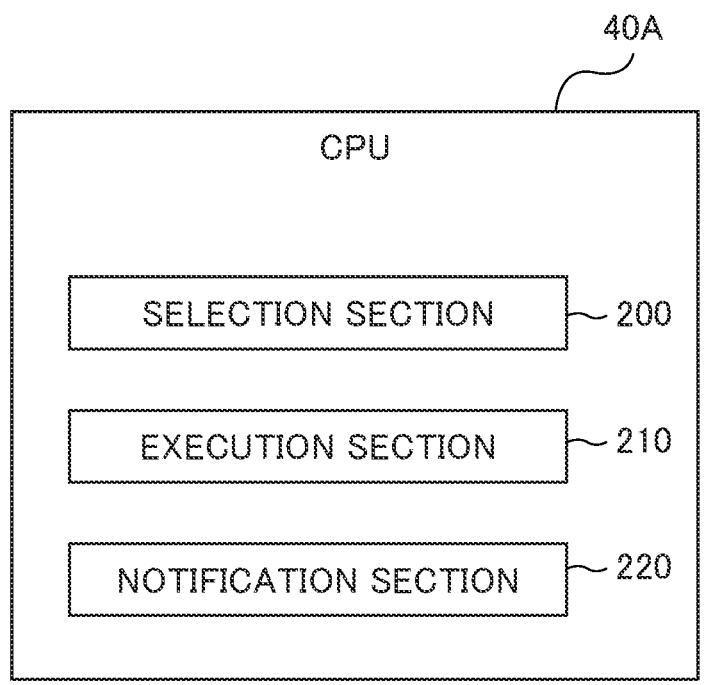
FIG. 4 is a block diagram showing functional structures of the terminal according to the first exemplary embodiment.

The control section 40 includes a CPU 40A, ROM 40B, RAM 40C and a communications interface 40D. The CPU 40A, ROM 40B, RAM 40C and communications interface 40D are connected to be capable of communications with one another via an internal bus (not shown in the drawings). Functions of the CPU 40A, ROM 40B, RAM 40C and communications interface 40D are similar to functions of the CPU 20A, ROM 20B, RAM 20C and wireless communications interface 20E of the verification ECU 20. In the control section 40 according to the present exemplary embodiment, by executing an execution program 150, the CPU 40A functions as a selection section 200, an execution section 210 and a notification section 220, which are shown in FIG. 4.

As shown in FIG. 3, the ROM 40B according to the present exemplary embodiment stores the execution program 150 and key information 160, which is information on a key of the vehicle 12. The execution program 150 is a program for implementing registration processing, duplication processing and response processing, which are described below. The key information 160 is data for verification with the key information 100 that is stored at the vehicle 12.

The touch panel 44 includes a liquid crystal display that serves as a display section and a touch sensor that serves as an input section.

The communication sections 42 include an NFC communication section 42A, a BLE communication section 42C, a UWB communication section 42D and a Wi-Fi® communication section 42E. The NFC communication section 42A, BLE communication section 42C and UWB communication section 42D are examples of a first communication section, and the Wi-Fi communication section 42E is an example of a second communication section.

As shown in FIG. 4, the selection section 200 features a function allowing a user to select which of the terminals 14B are to be operated as the key of the vehicle 12. More specifically, the selection section 200 allows a user to select the terminals 14B that are to operate as the key of the vehicle 12 from among the terminals 14B, which serve as an other device, displayed at the touch panel 44.

The execution section 210 features a function that executes duplication processing to each terminal 14B selected by the selection section 200 in order to allow the terminal 14B to be used as the key of the vehicle 12. The duplication processing transmits a duplication request from the terminal 14A, which is already operating as the key, to the terminal 14B that is to operate as the key subsequently. When an approval notification is received from the terminal 14B to which the duplication request has been transmitted, the duplication processing transmits the key information to the terminal 14B that transmitted the approval notification.

The execution section 210 transmits information to each terminal 14B identifying whether one or a plural number of the terminals 14B is implementing the duplication processing. The execution section 210 also transmits information to the terminal 14B indicating whether or not user approval at the terminal 14B is required.

In the present exemplary embodiment, the duplication processing may be executed in a case in which the terminal 14B that is to be a friend device is connected to the terminal 14A that is the owner device via the NFC communication section 42A, the BLE communication section 42C or the UWB communication section 42D. On the other hand, in a case in which the terminal 14B is connected to the terminal 14A via the Wi-Fi communication section 42E, the duplication processing cannot be executed. Therefore, in a case in which a terminal 14B that is connected via the Wi-Fi communication section 42E is selected by a user, the execution section 210 prompts connection with the NFC communication section 42A, BLE communication section 42C or UWB communication section 42D, and after the terminal 14B has reconnected via any one of the NFC communication section 42A, BLE communication section 42C and UWB communication section 42D, the execution section 210 executes the duplication processing to that terminal 14B.

The notification section 220 features a function that, in a case in which the execution section 210 has executed the duplication processing to each selected terminal 14B, notifies a result of the duplication processing to each terminal 14B to the user of the terminal 14A that is the owner device. More specifically, the notification section 220 notifies the results of the duplication processing to the user by a display at the touch panel 44.

—Flow of Control—

Flows of processing that is executed in the key management system 10 according to the present exemplary embodiment are described below using the flowcharts in FIG. 5, FIG. 8 and FIG. 9. The processing at each terminal 14 is implemented by the CPU 40A functioning as the selection section 200, the execution section 210 and the notification section 220. Although a situation in which the CPU 40A execute the processes shown in the drawings is recited, this is not limiting. The flowcharts described below may be implemented by one or more processors loading and executing programs stored at one or more memories.

First, the registration processing executed at the terminal 14A that is the owner device is described.

Figure 5:
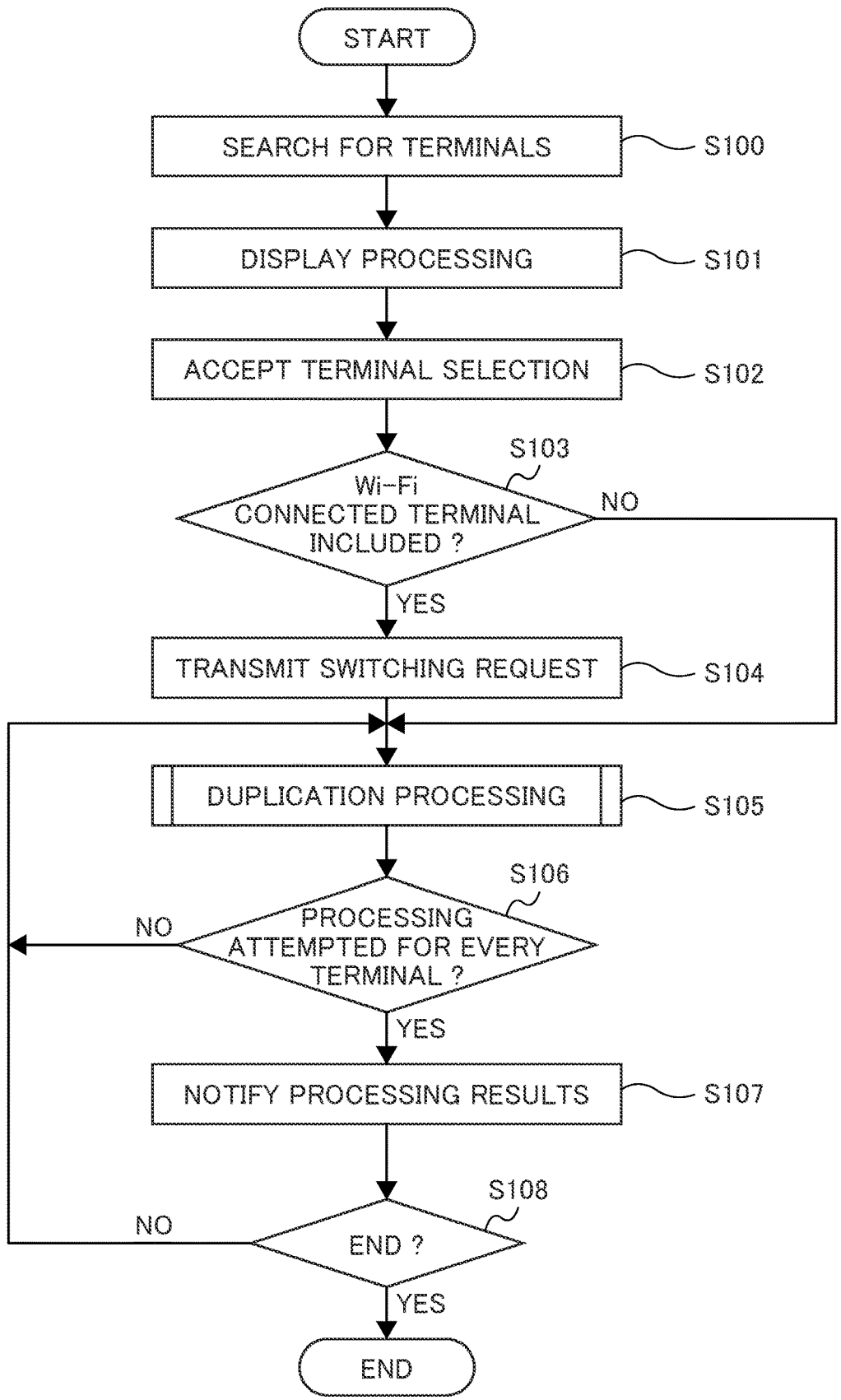
FIG. 5 is a flowchart showing a flow of registration processing at a terminal serving as an owner device according to the first exemplary embodiment.

In step S100 of FIG. 5, the CPU 40A searches for the terminals 14B that are connected via the respective communication sections 42.

Figure 6:
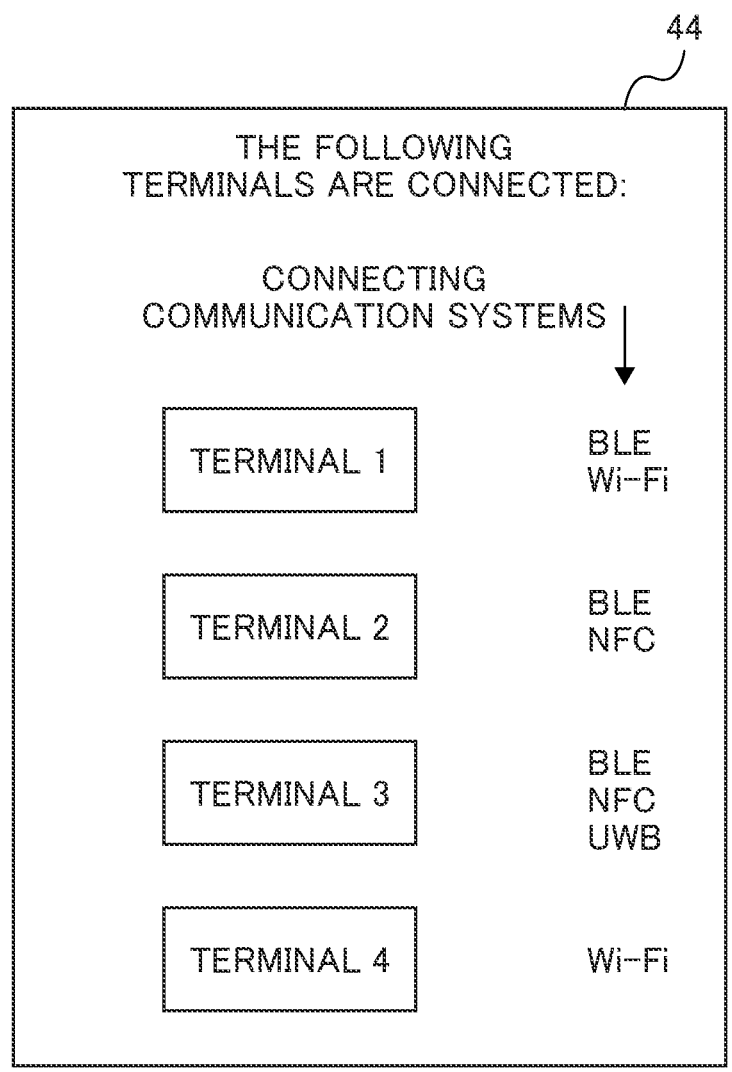
FIG. 6 is a diagram showing an example of an image of terminal names and communication systems that is displayed at a touch panel of the terminal serving as the owner device according to the first exemplary embodiment.

In step S101, the CPU 40A executes display processing. More specifically, the CPU 40A displays each terminal 14B connected to the terminal 14A at the touch panel 44. For example, as shown in FIG. 6, terminal names are displayed at the touch panel 44 together with the communication systems connecting those terminals.

In step S102 of FIG. 5, the CPU 40A accepts selection of each terminal 14B that is to duplicate the key and be a friend device. More specifically, the CPU 40A accepts selections of the terminals 14B displayed at the touch panel 44 through user operations on the touch panel 44.

In step S103, the CPU 40A makes a determination as to whether each terminal 14B is connected by Wi-Fi. In a case in which the CPU 40A determines that any of the terminals 14B is connected by Wi-Fi (Yes in step S103), the CPU 40A proceeds to step S104. Alternatively, in a case in which the CPU 40A determines that no terminal 14B is connected by Wi-Fi (No in step S103) the CPU 40A proceeds to step S105.

Figure 7:
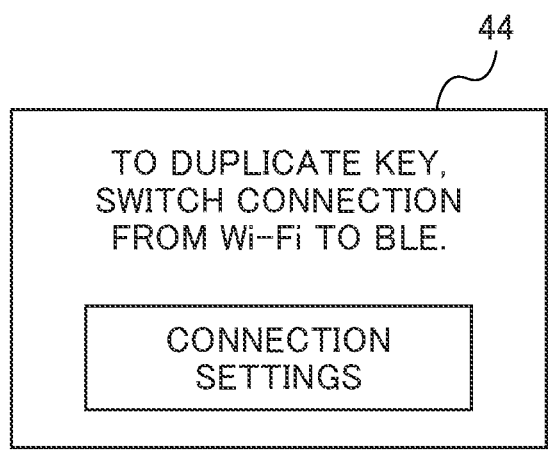
FIG. 7 is a diagram showing an example of an image prompting switching of a communication system that is displayed at the touch panel of a terminal serving as a friend device according to the first exemplary embodiment.

In step S104, the CPU 40A transmits a switching request to each terminal 14B connected by Wi-Fi. Accordingly, the terminal 14B receiving the switching request displays, for example, a screen at the touch panel 44 thereof that prompts switching of the connection from Wi-Fi to BLE, as illustrated in FIG. 7.

In step S105 of FIG. 5, the CPU 40A executes the duplication processing. Details of the duplication processing are described below.

In step S106, the CPU 40A makes a determination as to whether the duplication processing has been attempted to every terminal 14B. In a case in which the CPU 40A determines that the processing has been attempted to every terminal 14B (Yes in step S106), the CPU 40A proceeds to step S107. Alternatively, in a case in which the CPU 40A determines that the processing has not been attempted to every terminal 14B (No in step S106), the CPU 40A returns to step S105.

In step S107, the CPU 40A notifies processing results for the terminals 14B that have attempted duplication of the key. That is, for each terminal 14B that has succeeded in duplicating the key of the terminal 14A, the CPU 40A displays a message reporting the success of the duplication at the touch panel 44, and for each terminal 14B that has not succeeded in duplicating the key of the terminal 14A, the CPU 40A displays a message reporting the failure of the duplication at the touch panel 44.

In step S108, the CPU 40A makes a determination as to whether the registration processing is to end. For example, the CPU 40A determines that the registration processing is to end when the user operates an end button displayed at the touch panel 44. In a case in which the CPU 40A determines that the registration processing is to end (Yes in step S108), the CPU 40A ends the registration processing. Alternatively, in a case in which the CPU 40A determines that the registration processing is not to end (No in step S108), the CPU 40A returns to step S105. Thus, the registration processing may be executed repeatedly to each terminal 14B that has failed in duplication of the key.

Now, details of the duplication processing in step S105 are described.

Figure 8:
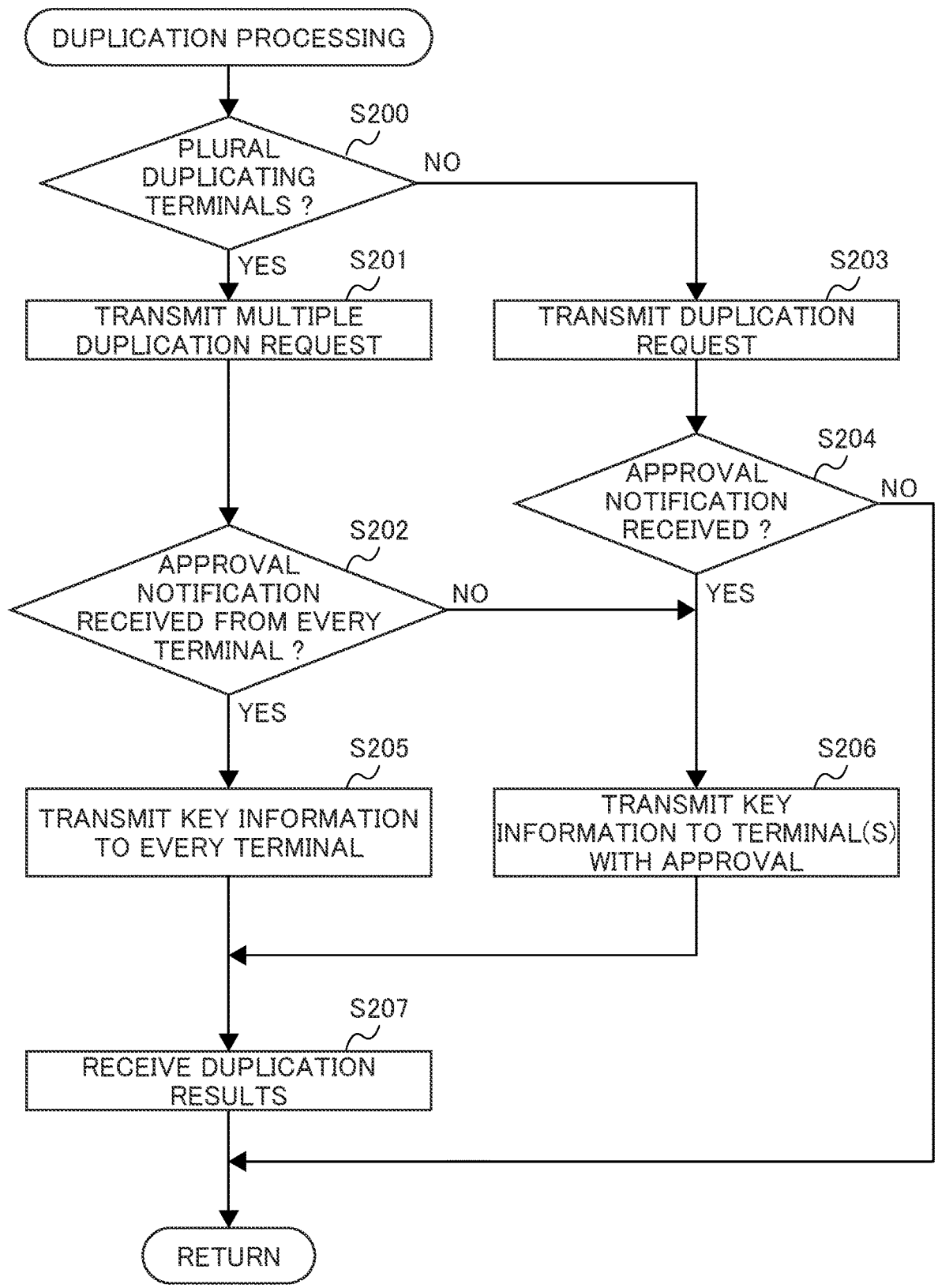
FIG. 8 is a flowchart showing a flow of duplication processing at the terminal serving as the owner device according to the first exemplary embodiment.

In step S200 of FIG. 8, the CPU 40A makes a determination as to whether a plural number of the terminals 14B are to duplicate the key. In a case in which the CPU 40A determines that plural terminals 14B are duplicating the key (Yes in step S200), the CPU 40A proceeds to step S201. Alternatively, in a case in which the CPU 40A determines that the terminal 14B duplicating the key is not plural, that is, is just one terminal (No in step S200), the CPU 40A proceeds to step S203.

In step S201, the CPU 40A transmits a multiple duplication request to each terminal 14B duplicating the key. The meaning of the term "multiple duplication request" as used herein includes a duplication request to which information indicating that the duplication processing is being performed at another of the terminals 14B is attached. Each terminal 14B receiving the multiple duplication request may identify that others of the terminals 14B are also performing the duplication processing. That is, the multiple duplication request is equivalent to "information identifying whether the [terminal 14B performing the duplication processing] is one device or a plurality of devices". The terminal 14B receiving the multiple duplication request may accept approval from a user for performing the duplication processing at the terminals 14B other than that terminal 14B. That is, the multiple duplication request is equivalent to "information . . . indicating whether or not user approval from the . . . other device is required".

In step S202, the CPU 40A makes a determination as to whether an approval notification has been received from every terminal 14B of the plural terminals 14B. In a case in which the CPU 40A determines that the approval notification has been received from every terminal 14B (Yes in step S202), the CPU 40A proceeds to step S205. Alternatively, in a case in which the CPU 40A determines that the approval notification has not been received from every terminal 14B (No in step S202), the CPU 40A proceeds to step S206.

In step S203, the CPU 40A transmits a duplication request to the terminal 14B that is duplicating the key.

In step S204, the CPU 40A makes a determination as to whether an approval notification has been received from the terminal 14B. In a case in which the CPU 40A determines that the approval notification has been received from the terminal 14B (Yes in step S204), the CPU 40A proceeds to step S206. Alternatively, in a case in which the CPU 40A determines that the approval notification has not been received from the terminal 14B (No in step S204), the CPU 40A ends the duplication processing.

In step S205, the CPU 40A transmits key information to every terminal 14B.

In step S206, the CPU 40A transmits the key information to each terminal 14B that has approval, that is, each terminal 14B that has transmitted the approval notification.

In step S207, the CPU 40A receives a duplication result from each terminal 14B to which the CPU 40A transmitted the key information. The CPU 40A then ends the duplication processing.

Now, details of response processing that is executed at each terminal 14B receiving the duplication request is described.

Figure 9:
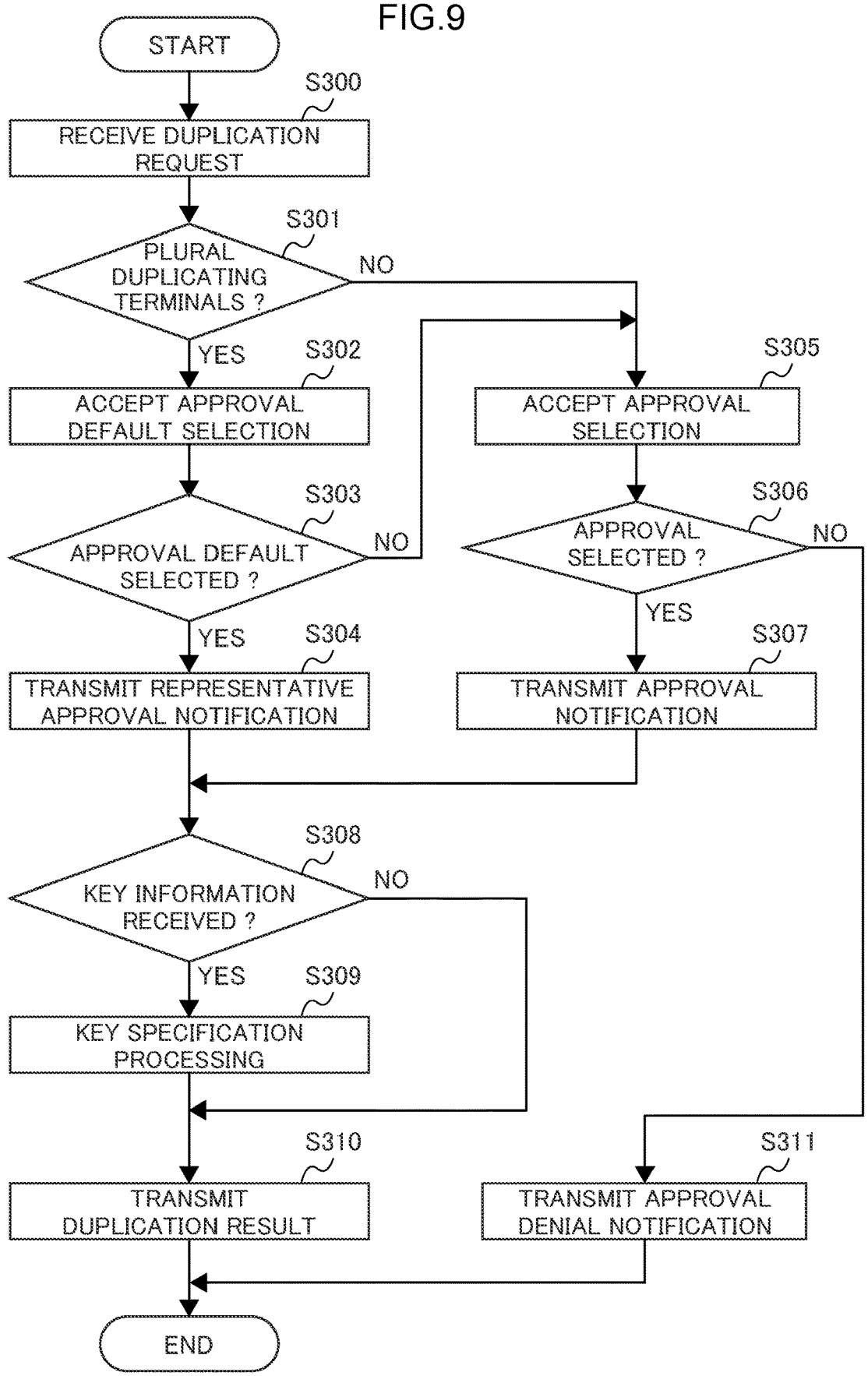
FIG. 9 is a flowchart showing a flow of response processing at the terminal serving as the friend device according to the first exemplary embodiment.

In step S300 of FIG. 9, the CPU 40A receives a duplication request from the terminal 14A.

In step S301, the CPU 40A makes a determination as to whether a plural number of the terminals 14B including the present terminal 14B are duplicating the key. This determination is implemented by determining whether the received duplication request is a multiple duplication request. In a case in which the CPU 40A determines that a plural number of the terminals 14B are duplicating the key (Yes in step S301), the CPU 40A proceeds to step S302. Alternatively, in a case in which the CPU 40A determines that the duplicating terminal 14B is not plural, that is, is just the one terminal 14B (No in step S301), the CPU 40A proceeds to step S305.

Figure 10:
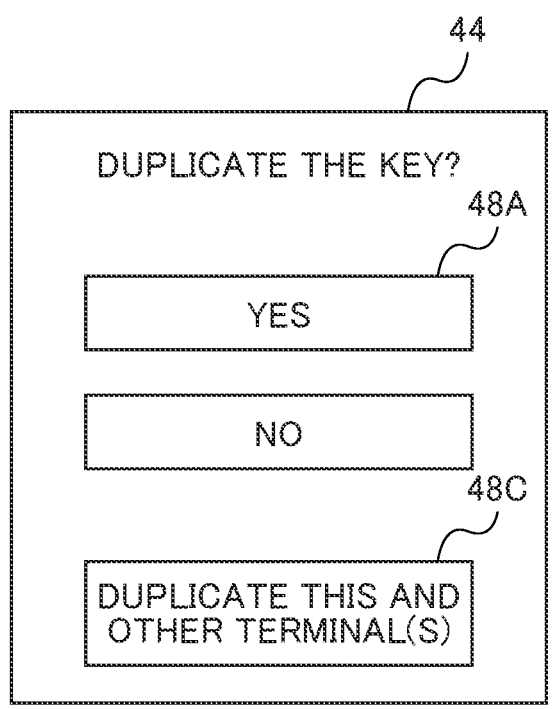
FIG. 10 is a diagram showing an example of an image requesting approval that is displayed at a touch panel of the terminal serving as the friend device according to the first exemplary embodiment.

In step S302, the CPU 40A accepts an approval default selection. The approval default selection is processing that makes approval selection the default for each other terminal 14B receiving the duplication request. For example, as illustrated in FIG. 10, the approval default selection is accepted by operation of a plural approval button 48C displayed at the touch panel 44 of the terminal 14B.

In step S303 of FIG. 9, the CPU 40A makes a determination as to whether approval default is selected, that is, whether the plural approval button 48C has been operated. In a case in which the CPU 40A determines that approval default is selected (Yes in step S303), the CPU 40A proceeds to step S304. Alternatively, in a case in which the CPU 40A determines that approval default is not selected (No in step S303), the CPU 40A proceeds to step S305.

In step S304, the CPU 40A transmits a representative approval notification to the terminal 14A. The representative approval notification is an approval notification for every terminal 14B.

In step S305, the CPU 40A accepts an approval selection. For example, as illustrated in FIG. 10, the approval selection is accepted by operation of an approval button 48A displayed at the touch panel 44 of the terminal 14B.

In step S306 of FIG. 9, the CPU 40A makes a determination as to whether approval is selected, that is, whether the approval button 48A has been operated. In a case in which the CPU 40A determines that approval is selected (Yes in step S306), the CPU 40A proceeds to step S307. Alternatively, in a case in which the CPU 40A determines that approval is not selected (No in step S306), the CPU 40A proceeds to step S311.

In step S307, the CPU 40A transmits an approval notification to the terminal 14A.

In step S308, the CPU 40A makes a determination as to whether the key information has been received from the terminal 14A. In a case in which the CPU 40A determines that the key information has been received (Yes in step S308), the CPU 40A proceeds to step S309. Alternatively, in a case in which the CPU 40A determines that the key information has not been received (No in step S308), the CPU 40A proceeds to step S310.

In step S309, the CPU 40A executes key specification processing. Thus, the key of the terminal 14A that is the owner device is duplicated at the present terminal 14B.

In step S310, the CPU 40A transmits a duplication result to the terminal 14A. Then the CPU 40A ends the response processing. For the duplication result, a duplication success notification is transmitted to the terminal 14A in a case in which the key specification processing is completed without any problem, and a duplication failure notification is transmitted to the terminal 14A in a case in which there is a problem in the key specification processing and the duplication of the key fails.

In step S311, the CPU 40A transmits an approval denial notification to the terminal 14A. Then the CPU 40A ends the response processing.

—Overview—

The terminal 14A according to the present exemplary embodiment is an information processing device that is usable as a key of the vehicle 12, and is configured to execute duplication processing that allows each terminal 14B selected at the touch panel 44 to be used as the key of the vehicle 12. That is, in the present exemplary embodiment, the user may set the selected terminals 14B to be friend devices in a batch at the terminal 14A that is the owner device. According to the present exemplary embodiment, when plural friend devices are added as the key of the vehicle 12, the effort of registering the additional devices may be reduced.

Each terminal 14 according to the present exemplary embodiment is configured to include a plural number of the communication sections 42 with different communication systems. The display processing causes the touch panel 44 to display terminal names of the terminals 14B that may duplicate the key together with the connecting communication systems. In the present exemplary embodiment as described above, each terminal 14B is formed to be incapable of executing the duplication processing when connected to the terminal 14A via the Wi-Fi communication section 42E. Therefore, the registration processing executed at the terminal 14A prompts each terminal 14B that is connected only via the Wi-Fi communication section 42E to reconnect with one of the communication sections 42 that enables execution of the duplication processing. Therefore, according to the present exemplary embodiment, the duplication processing may be performed even if the terminal 14B has been connected via a communication system with which the duplication processing is not possible.

The duplication processing may first be executed to each terminal 14B connecting via a communication section 42 other than the Wi-Fi communication section 42E, and after this duplication processing has ended, each terminal 14B connecting via the Wi-Fi communication section 42E may be prompted to reconnect via one of the communication sections 42 that enables execution of the duplication processing.

The terminal 14A according to the present exemplary embodiment includes the function that, after the duplication processing has been executed at every selected terminal 14B, reports a result of the duplication processing at each terminal 14B to the user of the terminal 14A (see step S107). Therefore, according to the present exemplary embodiment, the user may be allowed to select whether to exclude each terminal 14B at which the duplication processing has failed from the terminals 14B duplicating the key, or to retry the duplication processing.

The present exemplary embodiment includes the function that transmits the multiple duplication request to each terminal 14B as information identifying whether one or a plural number of the terminals 14B is performing the duplication processing (see step S201). Therefore, in a case in which it is verified at one of the terminals 14B that the key is being duplicated at a plural number of the terminals 14B including that terminal 14B, approval from the user of each other terminal 14B may be pre-empted. A setting may be made in advance at the terminal 14A such that user approval from every terminal 14B is pre-empted. In this situation, the key information is transmitted to each terminal 14B without an approval notification being received from the terminal 14B.

The present exemplary embodiment includes the function that transmits the multiple duplication request to each terminal 14B as information requesting approval for the performance of the duplication processing at each other terminal 14B (see step S201). Therefore, approval that encompasses each other terminal 14B may be accepted at one of the terminals 14B, and the one terminal 14B may be entrusted with the choice as to whether approval from other users is pre-empted.

As described above, when plural vehicles such as taxis, rental cars or the like are being managed in batches, the present exemplary embodiment is excellent for when adding plural friend devices from the terminal 14A that is a single owner device.

Second Exemplary Embodiment

In the second exemplary embodiment, the aforementioned display processing of step S101 is different from the processing according to the first exemplary embodiment. Below, differences from the first exemplary embodiment are described.

Figure 11:
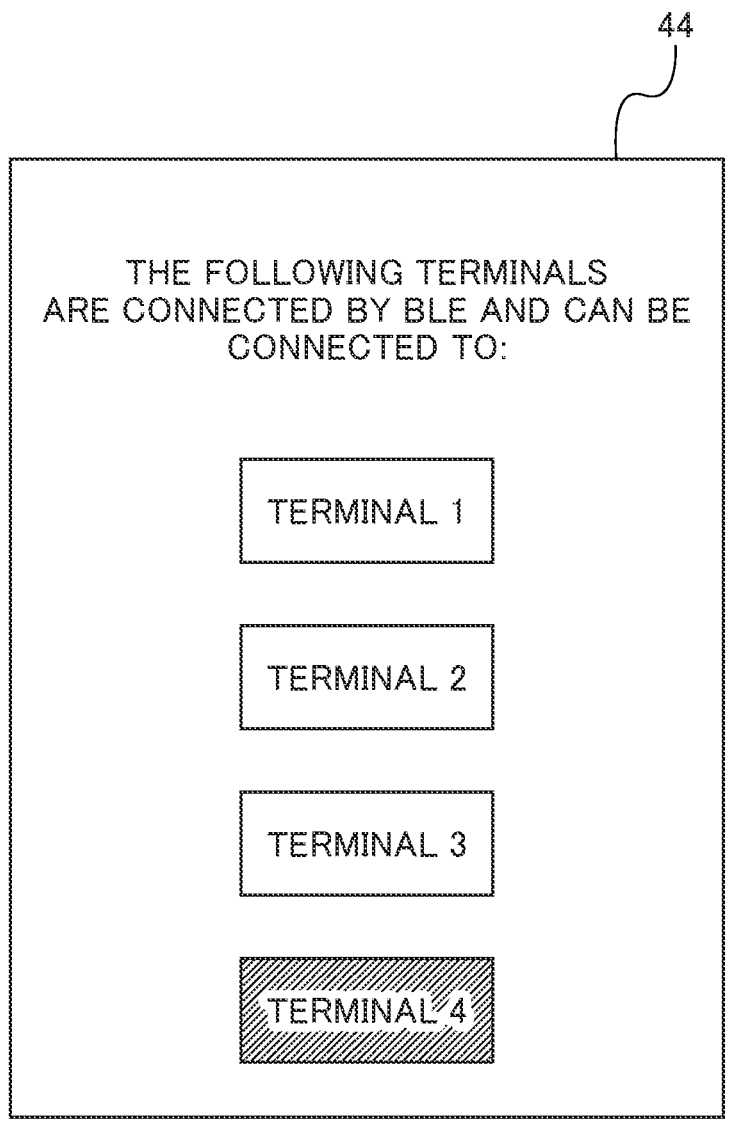
FIG. 11 is a diagram showing an example of an image of terminal names that is displayed at a touch panel of a terminal serving as an owner device according to a second exemplary embodiment.

According to the display processing of step S101, terminal names of the terminals 14B connected via the communication sections 42 other than the Wi-Fi communication section 42E are displayed at the touch panel 44 of the terminal 14A. For example, as illustrated in FIG. 11, only the terminal names of terminals that are connected via the BLE communication section 42C are displayed at the touch panel 44. In this case, terminal names of the terminals 14B that are connected via the communication sections 42 other than the BLE communication section 42C are shown grayed out. Control may be performed such that the terminal names of the terminals 14B that are connected via the communication sections 42 other than the BLE communication section 42C are not displayed.

Thus, according to the present exemplary embodiment, terminals for which the duplication processing is possible without changing the communication section 42 that is currently connecting may be displayed, and effort for a user of changing a communication system for the duplication processing may be reduced.

REMARKS

The duplication processing in the exemplary embodiment described above is implemented by direct communications between the terminal 14A and the terminals 14B, but this is not limiting. For example, the duplication processing may be implemented via the vehicle server 16A and terminal servers 16B or the like. In this case, an effect may be provided in that, when plural friend devices are added as the key of the vehicle 12, the effort of registering the additional devices may be reduced.

In the exemplary embodiments described above, the CPU 40A reads and executes software (programs) but the various processes may be executed by various kinds of processor other than a CPU. Examples of processors in these cases include a PLD (programmable logic device) in which a circuit configuration may be modified after manufacturing, such as an FPGA (field programmable gate array) or the like, a dedicated electronic circuit which is a processor with a circuit configuration that is specially designed to execute specific processing, such as an ASIC (application-specific integrated circuit) or the like, and so forth. The processing described above may be executed by one of these various kinds of processors, and may be executed by a combination of two or more processors of the same or different kinds (for example, plural FPGAs, a combination of a CPU with an FPGA, or the like). Hardware structures of these various kinds of processors are, to be more specific, electronic circuits combining circuit components such as semiconductor components and the like.

In the exemplary embodiments described above, modes are described in which programs are stored in advance (installed) on a computer readable non-transitory recording medium. For example, the execution program 150 of the control section 40 is stored in advance at the ROM 40B. However, this is not limiting and a program may be provided in a mode of being recorded on a non-transitory recording medium such as a CD-ROM (compact disc read-only memory), DVD-ROM (digital versatile disc read-only memory), USB (universal serial bus) memory or the like. Modes are also possible in which a program is downloaded from external equipment via a network.

The flows of processing described in the above exemplary embodiments are examples. Unnecessary steps may be removed, new steps may be added, and processing sequences may be rearranged within a scope not departing from the gist of the disclosure.

What is claimed is:

1. An information processing device that is usable as a key of a vehicle, the information processing device comprising:
   a display section that is configured to display information of at least one other device that is connected to the information processing device;
   a plurality of communication sections;
   a memory; and
   a processor coupled to the memory and that is configured to:
   receive a user selection selecting, from the at least one other device displayed at the display section, at least one other device to be operated as a key of the vehicle; and
   execute duplication processing to each of the selected at least one other device to allow the selected at least one other device to be used as the key of the vehicle;
   wherein:
   the plurality of communication sections include a first communication section and a second communication section of a different communication system from the first communication section;
   the display section is configured to display the at least one other device connected with the any one or more of the communication sections together with a type of a communication system of the communication section connected with the at least one other device; and
   in a case in which at least one other device that is connected with the second communication section is selected by the user, the processor is configured to prompt connection of the selected at least one other device with the first communication section and, after the selected at least one other device reconnects with the first communication section, execute the duplication processing to the selected at least one other device.

2. The information processing device according to claim 1,
   wherein the at least one other device displayed at the display section is connected only with any one or more of the communication sections.

3. The information processing device according to claim 1, wherein the processor is configured to, after the duplication processing has been executed to all of the selected at least one other device, report a result of the duplication processing of each of the selected at least other device to the user.

4. The information processing device according to claim 1, wherein the processor is configured to transmit, to the selected at least one other device for which the duplication processing is performed, information identifying whether the selected at least one other device is one device or a plurality of devices.

5. The information processing device according to claim 1, wherein:
   the duplication processing includes processing to transmit a duplication request from the information processing device to the selected at least one other device and, after an approval notification from the selected at least one other device to which the duplication request is transmitted is received, transmit information of the key to the selected at least one other device transmitting the approval notification; and
   the processor is configured to transmit information to the selected at least one other device indicating whether or not user approval from the selected at least one other device is required.

6. The information processing device according to claim 1, wherein the processor is configured to:
   in a case in which a user selection selecting a plurality of other devices to be operated as keys of the vehicle is received, transmit a multiple duplication request to each of the plurality of other devices, the multiple duplication request indicating that key duplication processing is to be performed for the plurality of other devices;
   determine whether an approval notification has been received from all of the plurality of other devices;
   in a case in which the approval notification has been received from all of the plurality of other devices, transmits key information to all of the plurality of other devices; and
   in a case in which the approval notification has not been received from all of the plurality of other devices, transmit the key information only to one or more devices from which the approval notification has been received.

7. The information processing device according to claim 6, wherein the processor is configured to:
   determine whether an approval default selection has been received from any one of the plurality of other devices; and
   in a case in which the approval default selection has been received from any one of the plurality of other devices, the approval notification for all of the plurality of other devices are made default.

8. An information processing method comprising:
   displaying information of at least one other device connected to an information processing device, the information processing device being usable as a key of a vehicle;
   receiving a user selection selecting, from the displayed at least one other device, at least one other device to be operated as a key of the vehicle;

executing duplication processing to each of the selected at least one other device to allow the selected at least one other device to be used as the key of the vehicle;

displaying the at least one other device connected to the information processing device with any one or more of communication sections together with a type of a communication section connected with the at least one other device; and in a case in which at least one other device that is connected with a second communication section is selected by the user, prompting connection of the selected at least one other device with a first communication section and, after the selected at least one other device reconnects with the first communication section, executing the duplication processing to the selected at least one other device.

9. A non-transitory storage medium storing a program that is executable by a computer to execute information processing, the information processing comprising:

displaying information of at least one other device connected to an information processing device, the information processing device being usable as a key of a vehicle;

receiving a user selection selecting, from the displayed at least one other device, at least one other device to be operated as a key of the vehicle;

executing duplication processing to each of the selected at least one other device to allow the selected at least one other device to be used as the key of the vehicle;

displaying the at least one other device connected to the information processing device with any one or more of communication sections together with a type of a communication section connected with the at least one other device; and in a case in which at least one other device that is connected with a second communication section is selected by the user, prompting connection of the selected at least one other device with a first communication section and, after the selected at least one other device reconnects with the first communication section, executing the duplication processing to the selected at least one other device.

* * * * *